US012524252B2

(12) United States Patent
Verma

(10) Patent No.: US 12,524,252 B2
(45) Date of Patent: Jan. 13, 2026

(54) SYSTEM FACILITATING SELF-SERVICE FOR MANAGING FUNCTIONALITY OF A SERVICE AND A METHOD THEREOF

(71) Applicant: HCL America Inc., Sunnyvale, CA (US)

(72) Inventor: Prafull Verma, Sunnyvale, CA (US)

(73) Assignee: HCL America Inc.

( * ) Notice: Subject to any disclaimer, the term of this patent is extended or adjusted under 35 U.S.C. 154(b) by 925 days.

(21) Appl. No.: 17/001,266

(22) Filed: Aug. 24, 2020

(65) Prior Publication Data
US 2022/0058033 A1 Feb. 24, 2022

(51) Int. Cl.
*G06F 9/448* (2018.01)
*G06F 9/48* (2006.01)
*G06F 16/23* (2019.01)

(52) U.S. Cl.
CPC ............ *G06F 9/4494* (2018.02); *G06F 9/485* (2013.01); *G06F 16/2379* (2019.01)

(58) Field of Classification Search
None
See application file for complete search history.

(56) References Cited

U.S. PATENT DOCUMENTS

| | | | |
|---|---|---|---|
| 8,271,402 B2 | 9/2012 | Fisher, Jr. | |
| 9,042,540 B2 | 5/2015 | Tuchman et al. | |
| 9,304,827 B2 | 4/2016 | Werth et al. | |
| 9,854,066 B1 | 12/2017 | Harper et al. | |
| 10,592,908 B1* | 3/2020 | Hanson | G06Q 30/016 |
| 2003/0095531 A1* | 5/2003 | Soerensen | H04B 1/7115 370/441 |
| 2018/0189088 A1* | 7/2018 | Chen | G06F 16/188 |
| 2019/0139004 A1* | 5/2019 | Vukovic | G06Q 30/016 |
| 2020/0192685 A1* | 6/2020 | Banaji | G06F 9/453 |
| 2021/0173670 A1* | 6/2021 | Borra | G06F 11/3466 |
| 2021/0174371 A1* | 6/2021 | Yoffe | G06F 11/325 |

OTHER PUBLICATIONS

Automated FAQ Answering with Question-Specific Knowledge Representation for Web Self-Service—Eriks Sneiders (Catania, Italy, May 21-23, 2009).

* cited by examiner

*Primary Examiner* — Wynuel S Aquino
(74) *Attorney, Agent, or Firm* — Kendal M. Sheets

(57) ABSTRACT

A system and method for facilitating self-device for managing functionality of a service is disclosed. One or more service components associated with a service are configured in at least one database. Further, the processor suggests one or more predefined action for managing the service. The one or more predefined actions are executed according to the one or more self-service components.

6 Claims, 5 Drawing Sheets

SYSTEM FACILITATING SELF-SERVICE FOR MANAGING FUNCTIONALITY OF A SERVICE AND A METHOD THEREOF

CROSS-REFERENCE TO RELATED APPLICATION AND PRIORITY

The present application does not claim priority from any patent application.

TECHNICAL FIELD

The present disclosure in general relates to a field of service management. More particularly, the present disclosure relates to a system and method facilitating self-service for managing functionality of a service.

BACKGROUND

Technology has embedded automation in almost all horizons of day-to-day life. Automation has further resulted in self-service portals facilitating self-help functions enabling and empowering a consumer to manage trials or make mid-cycle subscription changes.

In existing technologies, Information technology (IT) service desk acts as a primary point of engagement between consumers and service provider. Further, the consumers have to rely on the service desk to perform day-to-day activities. Such a dependency on service provider increases burden on overworked service desk agents as they only act as a mediator between the service provider and consumer. Such method of resolving issues through service agents is also time consuming and may get frustrating for the end user because the user might have to wait for long to get his work done and thus the user may lose interest in a particular service, in case the service issue remains unresolved.

Further, the existing technologies includes unnecessary involvement of service desk agents to perform repetitive tasks and increases number of tickets to manage service subscription. Such a ticket system results in increase in IT support costs due to requirement of 24/7 support from service desk.

SUMMARY

Before the present system and method for facilitating self-service for managing functionality of a service, is described, it is to be understood that this application is not limited to a particular system, and methodologies described, as there can be multiple possible embodiments which are not expressly illustrated in the present disclosure. It is to be understood that the terminology used in the description is for the purpose of describing the particular version or embodiments only and is not intended to limit the scope of the present application. This summary is provided to introduce concepts related to system and method for managing functionality of a service. This summary is not intended to identify essential features of the claimed subject matter nor is it intended for use in determining or limiting the scope of the claimed subject matter.

In one implementation a method facilitating self-service for managing functionality of a service is disclosed. The method comprises configuring, in at least one database, one or more self-service components associated with a service and each of the one or more self-service components may define one or more commands for managing the service. The method further comprises suggesting through a processor, one or more predefined actions for managing the service and one or more predefined actions are executed according to the one or more self-service components.

In another embodiment, a system facilitating self-service for managing functionality of a service is described. The system comprises a processor and a memory configured to processor. The memory stores a set of instructions to be executed by the processor and the processor is configured to configure, in at least one database within the system, one or more self-service components associated with the service. Each of the one or more self-service components defines one or more commands for managing the service. The processor may be further configured to suggest, through the processor, one or more predefined actions for managing the service. The one or more predefined actions are executed according to the one or more self-service components.

BRIEF DESCRIPTION OF DRAWINGS

The detailed description is described with reference to the accompanying figures. In the figure, the left-most digit (s) of a reference number identifies the figure in which the reference number first appears. The same number are used throughout the drawings to refer like features and components.

DETAILED DESCRIPTION

Some embodiment of the present disclosure, illustrating all its features, will now be discussed in detail. The words "including", "comprising", "consisting", "containing", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any system and methods similar or equivalent to those described herein can be used in the practice or testing of embodiments of the present disclosure, the exemplary, system and method for self-service for maintain functionality of a service are now described. The disclosed embodiments of the system and method facilitating self-service for managing functionality of a service are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for system facilitating self-service for managing functionality of a service an and method thereof is not intended to be limited to the embodiment illustrated, but is to be accorded the widest scope consistent with principles and features described herein.

Generally, existing technologies for self-service and support database involve service desk agents to perform repetitive tasks. There is also an increment in number of tickets to manage service subscription and hence require all time support from service desk agents. Such a dependency on service agents increases an overall cost for an organization and may also require a well-established IT support system.

The present subject matter addresses the problem of managing functionality of service through a self-service system. One or more self-service components associated with a service are configured in at least one database. The self-service components may define one or more commands for managing the service. Predefined actions for managing the service may be suggested through a processor. One or more predefined actions may be executed according to the one or more self-service components.

Self-service refers to self-help functions or commands facilitated to a user through a self-service portal. Self-service allows the user to request services, find information and resolve issues by following and executing the self-help functions or commands.

Figure 1:
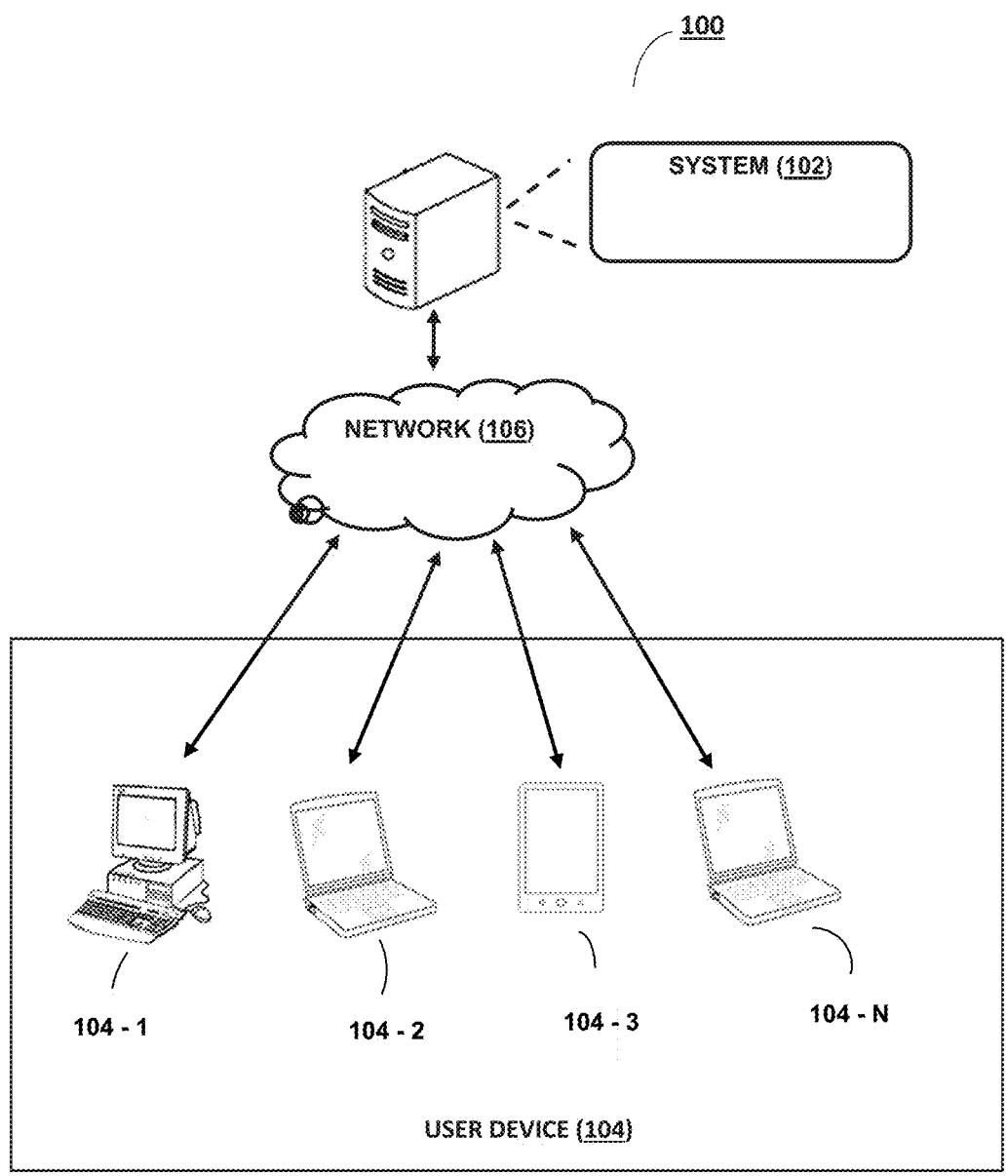
FIG. 1 illustrates a network implementation of a system 102 for facilitating self-service for managing functionality of a service, in accordance with an embodiment of the present subject matter.

Referring now to FIG. 1, a network implementation 100 of a system 102 facilitating self-service for managing functionality of a service is disclosed. Although the present subject matter is explained considering that the system 102 is implemented on a server, it may be understood that the system 102 may also be implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different type of networks that use a variety of protocols, for example, Hypertext Transfer Protocol (HTTP), and the like, to communicate with one another. Further, the network 106 may include a variety of network devices, including routers, bridges, servers, computing devices, storage devices and the like.

In one embodiment, the system 102 may receive one or more request for managing a self-service associated with one or more devices connected to a communication network 106. The one or more request may also be referred as one or more data inputs.

Figure 2:
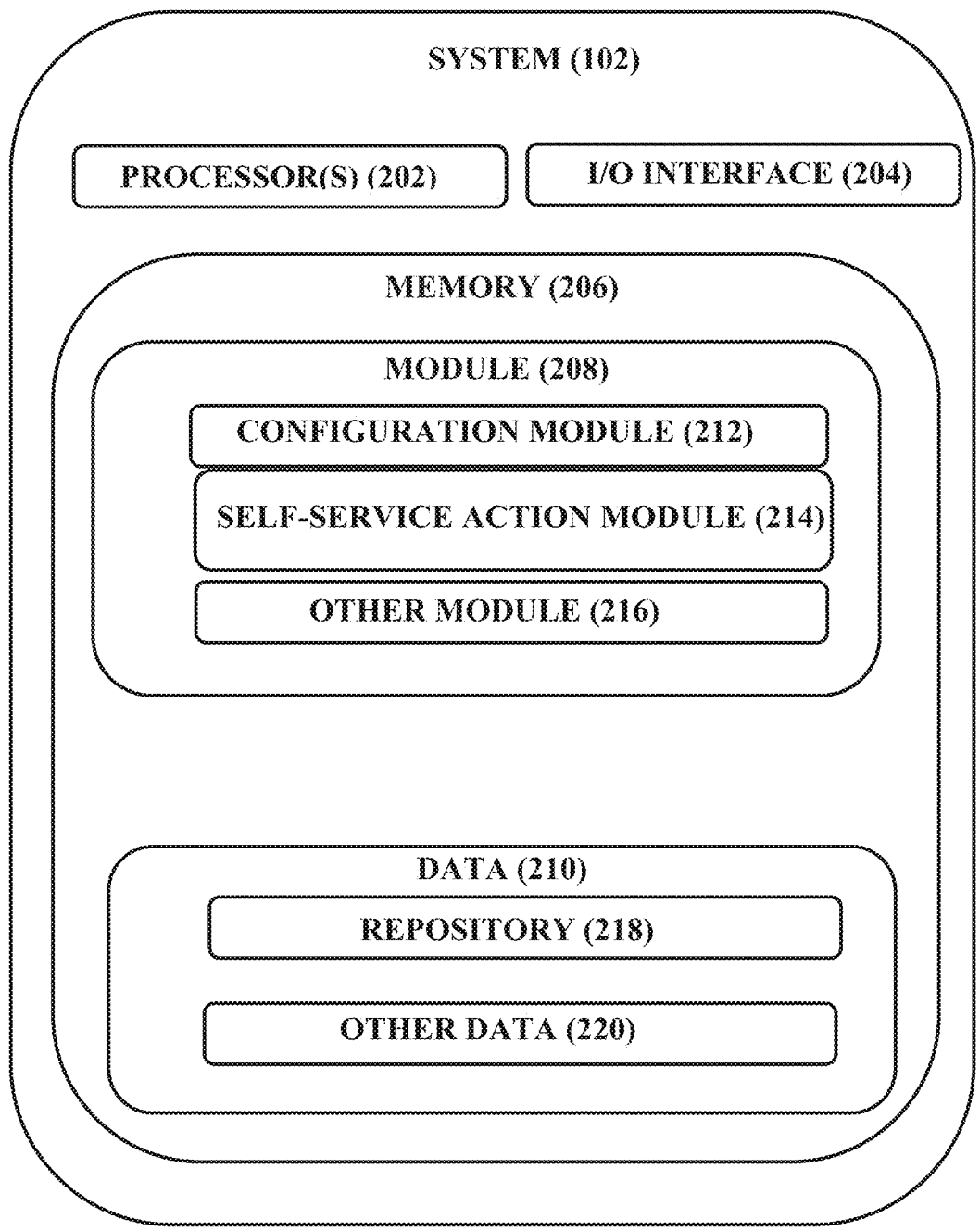
FIG. 2 illustrates an architecture of the system 102 for facilitating self-service for managing functionality of a service, in accordance with an embodiment of the present subject matter.

Referring now to FIG. 2, the system 102 for facilitating self-service for managing functionality of a service is illustrated in accordance with an embodiment of the present subject matter. In one embodiment, the system 102 may include at least one processor 202, an input/output (I/O) interface 204, and a memory 206. At least one processor 202 may be implemented as one or more microprocessors, microcomputers, microcontrollers, digital signal processors, central processing units, state machine logic circuitries, and/or any device that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communication with other computing devices, such as web servers and external data servers (not shown). The I/O interface 204 may facilitate multiple communication within a wide variety of networks and protocol types, including wired networks, for example, LAN, cable, etc, and wireless networks, such as WLAN, cellular, or satellite. The I/O interface 204 may include one or more ports for connecting a number of devices to one another or to another server.

In one implementation, a user may access the system 102 via the I/O interface. The user may be registered using the I/O interface in order to use the system 102. In one aspect, the user may access the I/O interface of the system 102 for obtaining information, providing input information or configuring the system 102.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The memory 206 is connected to a plurality of modules 208. The system 102 comprises a configuring module 212, self-service action module 214, and other modules 216. The other modules 216 may include programs or coded instructions that supplement applications and function of the system 102.

The data 210, amongst other things, serve as a database for storing data process, received, and generated by one or more of the modules 208. The 210 may also include a repository 218, and other data 220. In one embodiment, the other data 220 may include data generated as a result of the execution of one or more modules in the other modules 216.

In one embodiment, the configuration module 212 is configured for configuring one or more self-service components associated with a service in at least one database. Each of the one or more self-service components defines one or more commands for executing the steps for managing the service requested by the user. The one or more commands also facilitate automation of the request of the user towards the service.

In an example, the integrations may be built in a backend using an iPaaS wherein request from the organization platform flow into the service provider's platform. Further, an interaction between organization application and service provider's application occurs using REST APIs. Further, whenever a self-service action is triggered, an API call is made to the service provider's instance to notify the server-provider's system about the request of the user. On receiving the request, the service provider's application then does the processing at their end and complete the required action. On completion of the required action the service provider's system notifies the system back about the update through integration and the system changes the status of the service for the user.

In an embodiment the configuration module comprises steps executed to configure one or more self-service components associated with a service. The steps executed may comprise request by a service provider to publish the service on the portal.

Once the request by the service provider is accepted the service provider may create a list of service details that may be attached to the service. In an example the service details may comprise list of services available for consumption by the user, the name of the service provider, its price, self-service components etc. Further, each of the self-service components may be built on one or more service. The list of services may also refer to a service request catalogue, the list of services presents in front of the user, details of each service provided by the service provider. The self-service components are provided to the user through a portal accessed through the I/O interface 204.

Once the list of services is created one or more self-service components to be configured in the database may be published. The database refers to the repository 218 configured in the system 102. The list of services may be stored in the repository 218 and may be accessed by the user. The access to the services is supported according to access rules defined by a service provider.

The commands may be executed by the user without involving any other manual intervention. The service may comprise each of Information Technology (IT) and non-IT based services. Examples of self-service comprises managing subscriptions of at least one of the software license or hardware license and alike. The execution of the one or more predefined actions according to the service are enabled to the user.

In one embodiment, the self-service action module 214 may be configured to suggest the one or more predefined actions for managing the service automatically by the user. The predefined actions are executed according to the one or more self-service components.

In an example the predefined action may be one of a start action, renew action, pause option, or a reboot option depending on the type of service. The start action may initiate a service required for operation of the service, a pause option may initiate the pause of the service and the reboot option may completely stop the service and may then re-start it. The predefined actions may be modified to accommodate the self-service capabilities offered by the service provider.

Figure 3:
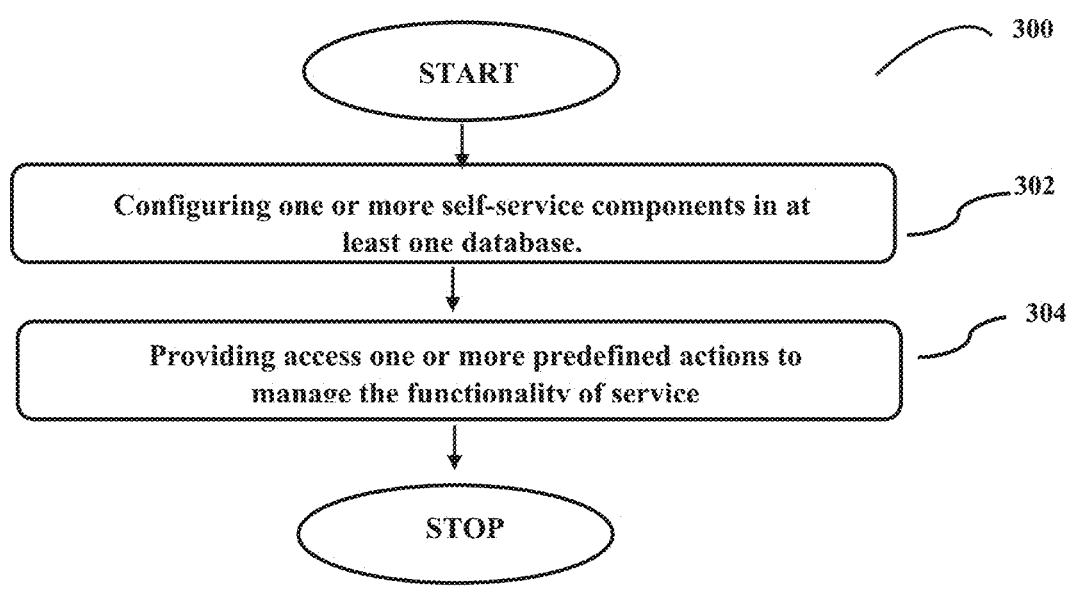
FIG. 3 illustrates a method for facilitating self-service for managing functionality of a service.

Referring now to FIG. 3, a method 300 facilitating self-service managing functionality of the service, is disclosed in accordance with an embodiment of the present subject matter. The method 300 may be described in the general context of computer executable instructions. Generally, computer executable instructions can include routines, programs, objects, components, data structure, procedure, modules, functions, and the like, that perform particular functions or implement particular abstract data types. The method 300 may also be practiced in a distributed computing environment where functions are performed by remote processing devices that are lined though a communications network. In a distributed computing environment. Computer executable instructions may be located in both local and remote computer storage media, including memory storage device.

The order in which the method 300 is described is not intended to be construed as a limitation, and any number of the described method blocks can be combined in any order to implement the method or alternate methods, Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, the one or more self-service components associated with the service are configured by the processor 202 in at least one database. The configuration of self-service components may comprise steps executed to configure one or more self-service components associated with a service. The steps executed may comprise request by a service provider to publish the service and its associated self-service components on the portal.

Further, the configuration of self-service components may comprise creating a list of service details. Further, each of the self-service components may be built on one or more service. The list of services may also refer to a service request catalogue. The list of services presents in front of the user, details about the services and its associated components provided by a service provider. Once the list of services is created, one or more self-service components to be configured in the database may be published.

The self-service components may define one or more commands for managing the functionality of a service. The self-service may correspond to a field of Information Technology (IT) and the non-IT based services.

Now, at block 304, once the self-service components are published the processor 202 may provide access to one or more predefined actions to manage the service and the predefined actions are executed by the processor 202 according to the different self-service components. The predefined actions may depend on the service selected by the user.

In an example embodiment, the predefined actions may include function such as the start action, the renew action, the pause option, or the reboot option. The predefined actions may be modified to accommodate the self-service capabilities offered by the service provider.

In one embodiment, the one or more predefined actions may be executed according to the service availed by the user. The predefined actions may be offered by the service provider. The predefined actions are automatic and dependent on the configuration of the system 202.

Figure 4:
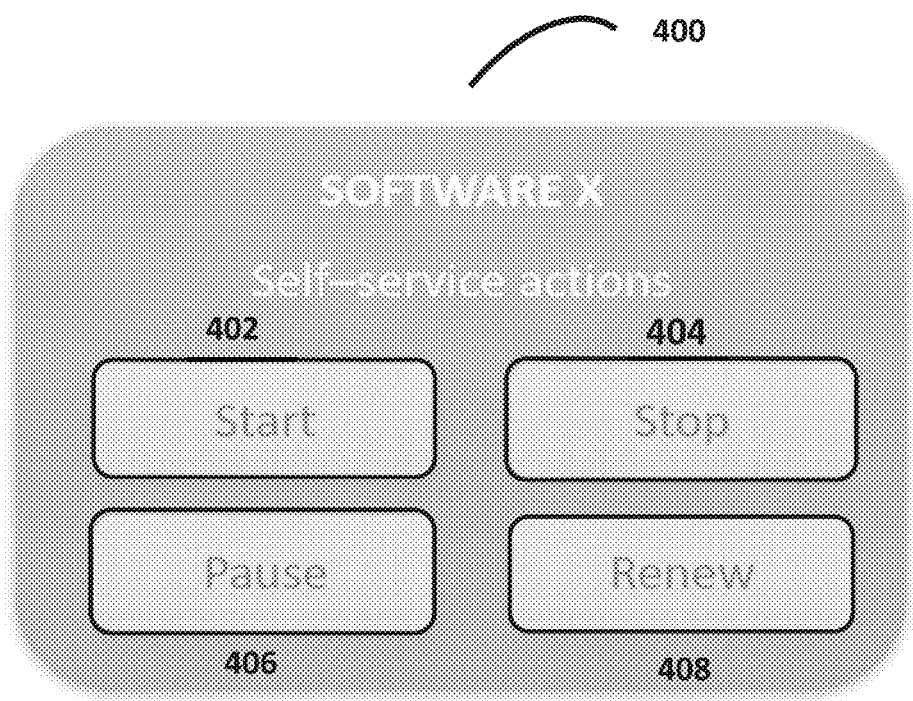
FIG. 4 illustrates an execution of method for an Information Technology (IT) based services.
Figure 5:
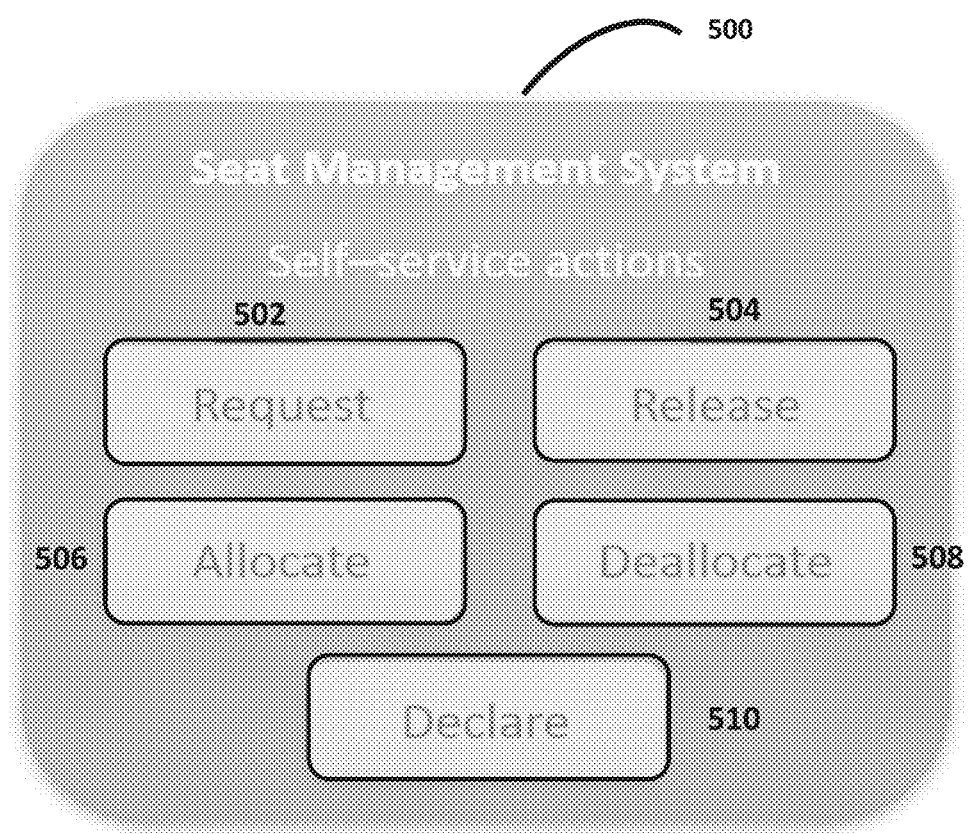
FIG. 5 illustrates an execution of method for a non-Information Technology (non-IT) based services.

In accordance with an embodiment, FIG. 4 and FIG. 5 in combination discusses additional details of the method 300 through an example. The present system 102 and the method 300 may be used for facilitating self-service towards each of the Information technology (IT) service and the non-Information Technology services.

Further, FIG. 4 illustrates an example that corresponds to a predefined action to manage a subscription of a software X. The predefined actions that the user may execute includes each of the start action 402, the stop action 404, the pause action 406 and the renew action 408. In an example, consider the user has subscribed to the software X and wants to manage the subscription. To manage the subscription depending on requirement, the user may pause it temporarily 406, start it over again 402. Stop when not required 404 and may renew it if the subscription period ends 408. The instruction may be directed to the service provider and the service provider may execute the action requested at his end.

In another exemplary embodiment, FIG. 5 shows the deployment of the system 102 as a seat management system in one of an office seat, In an example embodiment a manager may manage subscription of an employee through the self-service actions without reaching to anyone. The predefined actions that can be used to manage the subscription of the employee may include request 502, release 504, allocate 506, deallocate 508 and declare 510. On receiving a request for the subscription of an employee through 502, the manager may release the subscription of the employee through 504. Further, the manager may allocate or reallocate the subscription (506 and 508) and declare though 510.

Exemplary embodiments discussed above may provide certain advantages. Though not required to practice aspects of the disclosure, the advantages may include those provided by the following features.

Some embodiments of the system 102 and the method 300 may help in managing functionality of a service without service desk agents and the end user may self-check the consumption related details of the service.

Some embodiments of the system 102 and the method 300 may ease the pressure and dependency on overworked service desk agents.

Some embodiments of the system 102 and the method 300 may reduce the time in achieving the desired outcomes of managing the subscription of service without depending on support provider for receiving the response.

The invention claimed is:

1. A method facilitating self-service for managing functionality of a service, the method comprising:
configuring, in at least one database, one or more self-service components associated with a service, wherein each of the one or more self-service components defines one or more commands for managing the service for a user through a self-service portal without intermediary agent initiating an action on behalf of the user, and wherein the configuring further comprises:
receiving, from a service provider, details related to a service offering via an application programming interface (API), wherein the details related to the service offering comprises service names, descriptions, a pricing, and access rules;
creating a list of services to be maintained by the user, based on details related to service offerings received from one or more service providers,
wherein each of the self-service components is built on one or more services;
creating, by a processor, the one or more self-service components corresponding to each service in the list, wherein each of the self-service component defines the one or more commands that trigger actions through the API;
publishing the one or more self-service components to be configured in the at least one database, wherein the at least one database refers to a repository, and the list of services is stored in the repository, wherein the list of services is accessed by the user, based on the access rules; and
storing configuration details in the at least one database, allowing users to access various services through a unified self-service interface;
suggesting, through the processor, the one or more predefined actions for managing the service, wherein the one or more predefined actions are executed according to the one or more self-service components; and
automatically executing, the one or more predefined actions by transmitting a command through the API to the service provider, thereby updating a service status in the database and reducing operational costs.

2. The method as claimed in claim 1, wherein the service comprises each of Information Technology (IT) and non-IT based services.

3. The method as claimed in claim 1, wherein the one or more predefined actions comprise one of a start action, a stop action, a pause option, or a reboot option or the one or more self-service components.

4. The method as claimed in claim 1, comprising:
executing, the one or more predefined actions according to the service maintained by the user, wherein the one or more predefined actions are taken by a service provider from the one or more service providers, wherein the predefined actions may be automatic.

5. A system facilitating self-service for managing functionality of a service, the system comprising:
a processor; and
a memory configured to the processor, wherein the memory stores a set of instructions to be executed by the processor, wherein the processor is configured to:
configure, in at least one database, one or more self-service components associated with a service, wherein each of the one or more self-service components defines one or more commands for managing the service for a user through a self-service portal without intermediary agent initiating an action on behalf of the user, and wherein the configuring further comprises:
receiving, from a service provider, details related to a service offering via an application programming interface (API), wherein the details related to the service offering comprises service names, descriptions, a pricing, and access rules;
creating a list of services to be maintained by the user, based on details related to service offerings received from one or more service providers,
wherein each of the self-service components is built on one or more services;
creating, by a processor, the one or more self-service components corresponding to each service in the list, wherein each of the self-service component defines the one or more commands that trigger actions through the API;
publishing the one or more self-service components to be configured in the at least one database, wherein the at least one database refers to a repository, and the list of services is stored in the repository, wherein the list of services is accessed by the user, based on the access rules; and
storing configuration details in the at least one database, allowing users to access various services through a unified self-service interface;
suggest, through the processor, the one or more predefined actions for managing the service, wherein the one or more predefined actions are executed according to the one or more self-service components; and
automatically execute, the one or more predefined actions by transmitting a command through the API to the service provider, thereby updating a service status in the database and reducing operational costs.

6. The system as claimed in claim 5, wherein the one or more predefined actions comprise one of a start action, a stop action, a pause option, or a reboot option or the one or more self-service components.

* * * * *